(No Model.)
C. P. YOUNG.
PNEUMATIC TIRE.
No. 598,460. Patented Feb. 1, 1898.
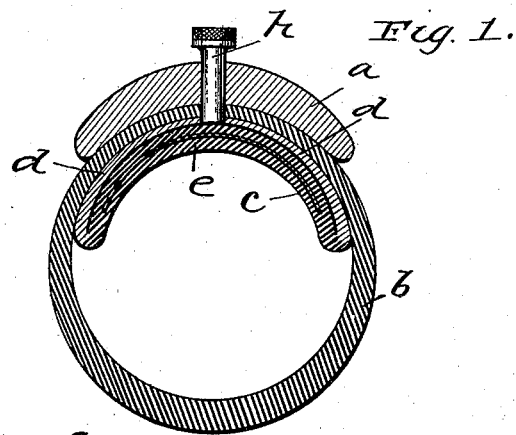
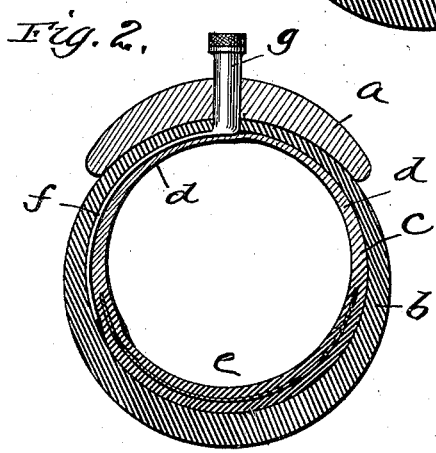
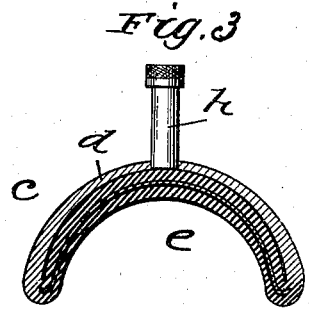
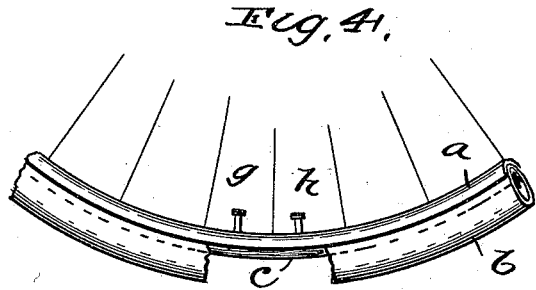
Witnesses
Inventor
Charles P. Young
By Alexander Davis
Attorneys

UNITED STATES PATENT OFFICE.

CHARLES P. YOUNG, OF YORK, PENNSYLVANIA.

PNEUMATIC TIRE.

SPECIFICATION forming part of Letters Patent No. 598,460, dated February 1, 1898.

Application filed July 2, 1897. Serial No. 643,282. (No model.)

*To all whom it may concern:*

Be it known that I, CHARLES P. YOUNG, a citizen of the United States, residing at York, in the county of York and State of Pennsylvania, have invented certain new and useful Improvements in Pneumatic Tires, of which the following is a specification, reference being had therein to the accompanying drawings, in which—

Figure 1 is a transverse section, the outer tube being inflated; Fig. 2, a similar view showing the inner tube inflated to cure a puncture in the outer tube; Fig. 3, a similar view of the tube detached; and Fig. 4, a side elevation, partly broken away, of a portion of the wheel-rim provided with my tire.

The object of this invention is to provide the ordinary pneumatic tire with an inclosed emergency-tube which can be inflated when the outer tire becomes punctured, and thus enable the rider to continue on his way, as hereinafter set forth.

Referring to the drawings by letter, *a* designates the rim of an ordinary bicycle-wheel, and *b* the ordinary pneumatic tire attached thereto, the rim being concaved to partly embrace the tire. Within the tire is an auxiliary tube *c*, which when inflated will fill and support the outer tire. This inner tube is made quite thin along its upper or inner portion, as at *d*, and its lower or outer half *e* is thickened and rendered non-puncturable by the insertion of a strip of rawhide or a series of layers of canvas or otherwise. The lower or non-puncturable part *e* is comparatively stiff and normally springs up against the thinner part of the tube, as shown in Fig. 3. The thinner or upper portion of the tube is vulcanized or cemented to the interior of the outer tube about half-way around the tubes, thereby converting the tire into two air-compartments, the non-puncturable part forming the diaphragm.

It will be observed that the outer tube may be inflated through a tube *f*, connected to an ordinary valve-casing *g* (carried by the rim) and extending around the inner tube to the air-space between the two tubes, and the inner tube may be inflated through a valve *h*, passing through the rim and the two tubes.

When the outer tire becomes punctured and the air escapes therefrom, the inner or emergency tire may then be inflated to expand and support the outer tube, as shown in Fig. 2. This brings the non-puncturable stiffened part or diaphragm of the emergency-tube against the tread portion of the tire, thus rendering a second puncture practically impossible. The stiffened non-puncturable part necessarily destroys considerable of the resilience of the tire; but this will be more than compensated for by the fact that the danger of a second puncture is practically eliminated. This provision for instantaneously curing a puncture and at the same time rendering the tire non-puncturable thereafter (even though the resilience of the tire be temporarily destroyed) will be very valuable in many cases, especially in the case of the military use of the vehicle provided with the tire, as in that use of the tire a temporary destruction of a portion of its resiliency will not be of as much moment as the rendering of it non-puncturable.

It will be observed that when the emergency-tire is not in use it normally presses up against the upper part of the tire, it being normally collapsed into a semicircular shape in cross-section, as shown in Fig. 3, whereby it will not interfere with the resiliency of the main tire, while it will brace the main tire against the rim and assist in preventing the edges of the rim from wearing the tire at those points. It will also be seen that rendering the tread portion of the inner tube non-puncturable effectually prevents injury to the upper parts of the tire and the rim by a nail or other sharp instrument passing up through the tread portion of the main tire. This is important, as it is well known that the most serious punctures are those where the puncturing device passes through the tire and up into the rim.

The non-puncturable or tread portion of the emergency-tire may have its longitudinal edges cemented or vulcanized into the main tube along near its middle, if desired, and thereby do away entirely with the upper or thin part of the emergency-tube; but it is desirable to employ a complete tube and cement or vucanize it to the outer tube during its manufacture, as in that manner all danger of leakage at the edges of the non-puncturable diaphragm is avoided.

An advantage resulting from having the tread portion of the emergency-tire normally spring up and press against the rim is that should the main tire be but loosely inflated the emergency-tire will materially assist in preventing the edges of the rim wearing punctures in the tire.

It will also be observed that the stiff non-puncturable edges of the tread portion of the inner tire when the same is in its normal or deflated condition extend outward beyond the edges of the rim, so that should the tire be deflated suddenly the weight of the rider will be thrown upon the inner tube and serious damage to the outer tire by the same being closely folded or doubled against the rim edges will be avoided. This is important, as many tires are injured seriously after deflation and before the riders can dismount.

I am aware that it is not new to inclose within the main tire a supplemental tube of thin rubber adapted to be normally collapsed against the rim portion of the outer tire and to be inflated to cure punctures in the tire; but this said inner tube does not perform the function of my inner tire, since it is not stiff and non-puncturable. I am also aware that it is not new to construct a pneumatic tire of a series of tubes inclosed one within the other and having non-puncturable strips inserted in the air-spaces between said tubes, the several tubes forming a "laminated" tire. Nor is this latter construction the equivalent of my improved tire, since the several tubes and non-puncturable strips form in reality but a single tire, provided with a single charging-valve extending to the innermost tube.

Having thus fully described my invention, what I claim, and desire to secure by Letters Patent, is—

A compound pneumatic tire, consisting of an outer tire and an inner tread portion or diaphragm extending across the interior of the outer tire and dividing the same into two air-compartments, said diaphragm being non-puncturable and pressing normally against the rim portion of the outer tire and having its edges projecting beyond the edges of the rim, and independent air-valves leading into said air-compartments, as and for the purposes set forth.

In testimony whereof I affix my signature in presence of two witnesses.

CHARLES P. YOUNG.

Witnesses:
LEE REINEBERG,
ED CONNELLEE.